United States Patent
Kikuchi et al.

(10) Patent No.: US 11,148,742 B2
(45) Date of Patent: Oct. 19, 2021

(54) STORAGE CASE

(71) Applicant: HONDA MOTOR CO., LTD., Tokyo (JP)

(72) Inventors: Takehiko Kikuchi, Wako (JP); Shun Niijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

(21) Appl. No.: 16/797,250

(22) Filed: Feb. 21, 2020

(65) Prior Publication Data

US 2020/0290696 A1    Sep. 17, 2020

(30) Foreign Application Priority Data

Mar. 13, 2019    (JP) .............................. JP2019-046186

(51) Int. Cl.
| | |
|---|---|
| *B62J 9/27* | (2020.01) |
| *B62J 9/23* | (2020.01) |
| *B62J 9/30* | (2020.01) |
| *B62J 9/26* | (2020.01) |

(52) U.S. Cl.
CPC . *B62J 9/27* (2020.02); *B62J 9/23* (2020.02); *B62J 9/26* (2020.02); *B62J 9/30* (2020.02)

(58) Field of Classification Search
CPC ......... B62J 9/26; B62J 7/04; B62J 7/08; B62J 9/00; B62J 9/23; B62J 9/24; B62J 9/27; B62J 9/30
USPC .................................................. 224/429–431
See application file for complete search history.

(56) References Cited

U.S. PATENT DOCUMENTS 8,864,002 B2 * 10/2014 Iida ........................... B62J 7/04
                                                                224/413

FOREIGN PATENT DOCUMENTS

| DE | 19511013 A1 * | 9/1996 |
| DE | 19511013 A1 | 9/1996 |
| EP | 2597019 * | 5/2013 |
| EP | 3696062 A1 | 8/2020 |
| JP | 2010-047164 | 3/2010 |

OTHER PUBLICATIONS

"Macnine Translation of EP0734463/DE19511013", https://translationportal.epo.org/emtp/translate/?ACTION=description-retrieval&COUNTRY=EP&ENGINE=google&FORMAT=docdb&KIND=A2&LOCALE=en_EP&NUMBER=0734663&SRCLANG=de&TRGLANG=en, retrieved May 5, 2021. (Year: 1996).*

(Continued)

*Primary Examiner* — Adam J Waggenspack
(74) *Attorney, Agent, or Firm* — Rankin, Hill & Clark LLP

(57) ABSTRACT

A link mechanism includes a first link connected to an operation element, and a second link for connecting the first link and a hook member. The hook member includes a hook portion disposed on a distal end portion of the hook member and engaged with the vehicle body, and a link mechanism connecting portion disposed on a base end portion of the hook member and connected to a first connecting shaft on one end portion of the second link. The hook member is pivotably supported by a turning shaft disposed between the hook portion and the link mechanism connecting portion. When the hook portion is engaged with the vehicle body, a straight line L1 connecting the turning shaft and the first connecting shaft is substantially orthogonal to a straight line connecting the first connecting shaft and a second connecting shaft, which is connected to the first link.

6 Claims, 7 Drawing Sheets

(56) References Cited

OTHER PUBLICATIONS

German Search Report with English translation dated Nov. 20, 2020, 11 pages.
Japanese Office Action with English translation dated Jan. 5, 2021, 7 pages.
German Office Action with English translation dated Mar. 26, 2021, 9 pages.

* cited by examiner

STORAGE CASE

INCORPORATION BY REFERENCE

The present application claims priority under 35 U.S.C. § 119 to Japanese Patent Application No. 2019-046186 filed on Mar. 13, 2019. The content of the application is incorporated herein by reference in its entirety.

TECHNICAL FIELD

The present invention relates to a storage case.

BACKGROUND ART

Conventionally, there has been a known storage case including an operation element, a hook member, and a link mechanism for joining the operation element and the hook member, in which the hook member is engaged with a vehicle body of a saddle riding vehicle in interlock with operation of the operation element (e.g. see Patent Document 1).

PRIOR ART DOCUMENT

Patent Document

Patent Document 1

Japanese Patent Laid-Open No. 2010-47164

SUMMARY OF THE INVENTION

Problem to be Solved by the Invention

Incidentally, in the conventional storage case as described above, the link mechanism and the hook member may be oscillated due to a design tolerance required for turning the link mechanism for joining the hook member and the operation element in some cases. Thus, it is demanded to reduce the oscillation of the link mechanism and the hook member and to more firmly attach the storage case to the vehicle body.

The present invention has been made in view of the aforementioned circumstance, and an object of the present invention is to reduce the oscillation of the link mechanism and the hook member, so that the storage case can be more firmly attached to the vehicle body.

Means for Solving the Problem

The storage case includes an operation element (56), a hook member (55), and a link mechanism (65) for joining the operation element (56) and the hook member (55). In the storage case in which the hook member (55) is engaged with a vehicle body of a saddle riding vehicle (1) in interlock with operation of the operation element (56), the link mechanism (65) includes a first link (67) connected to the operation element (56), and a second link (68) for connecting the first link (67) and the hook member (55). The hook member (55) includes a hook portion (76) disposed on a distal end portion of the hook member (55) and engaged with the vehicle body, and a link mechanism connecting portion (77) disposed on a base end portion of the hook member (55) and connected to a first connecting shaft (80) on one end portion of the second link (68). The hook member (55) is pivotably supported by a turning shaft (78) disposed between the hook portion (76) and the link mechanism connecting portion (77). A second connecting shaft (82) connected to the first link (67) is disposed on the other end portion of the second link (68). When the hook portion (76) is engaged with the vehicle body, a straight line (L1) connecting the turning shaft (78) and the first connecting shaft (80) is substantially orthogonal to a straight line (L2) connecting the first connecting shaft (80) and the second connecting shaft (82).

Also, in the above configuration, one end portion of the first link (67) is pivotably supported by a link turning shaft (79), and the other end portion of the first link (67) is connected to the second connecting shaft (82) of the second link (68). The first link (67) is connected to the operation element (56) via an operation element-side link (66) disposed between the first link (67) and the operation element (56). One end portion of the operation element-side link (66) is connected to the operation element (56), and the other end portion of the operation element-side link (66) may be connected to the first link (67) via a link connecting shaft (83) disposed between the link turning shaft (79) and the second connecting shaft (82).

Additionally, in the above configuration, the turning shaft (78) and the link turning shaft (79) may be fixed to the storage case so as not to move relative to each other.

Furthermore, in the above configuration, the first link (67) is connected to the operation element (56) via the operation element-side link (66) disposed between the first link (67) and the operation element (56). The operation element-side link (66) includes a first stopper portion (85) that comes into contact with the operation element (56) in association with turning of the operation element-side link (66). When the hook portion (76) is not engaged with the vehicle body, the first stopper portion (85) may be separated from the operation element (56), and when the hook portion (76) is engaged with the vehicle body, the first stopper portion (85) may come into contact with the operation element (56).

In addition, the above configuration includes a storage case body (61) for storing articles, and a cover member (62) attached to the storage case body (61) and covering the link mechanism (65). The operation element (56) includes a second stopper portion (73) that comes into contact with the cover member (62) in association with turning of the operation element (56). When the hook portion (76) is not engaged with the vehicle body, the second stopper portion (73) may be separated from the cover member (62), and when the hook portion (76) is engaged with the vehicle body, the second stopper portion (73) may come into contact with the cover member (62).

Also, in the above configuration, the operation element (56) is pivotably supported by an operation element turning shaft (56a). The other end portion of the operation element-side link (66) is connected to the first link (67) via the link connecting shaft (83). The one end portion of the operation element-side link (66) is connected to the operation element (56) via an operation element connecting shaft (84). When the hook portion (76) is engaged with the vehicle body, of angles which are formed by a straight line (L3) connecting the link connecting shaft (83) and the operation element connecting shaft (84) and a straight line (L4) connecting the operation element connecting shaft (84) and the operation element turning shaft (56a), an angle (A2) which is on a side that the angle increases in a case of releasing the engagement of the hook portion (76) with the vehicle body is smaller than 180°.

Effects of the Invention

The storage case includes an operation element, a hook member, and a link mechanism for joining the operation element and the hook member. The hook member is engaged with a vehicle body of a saddle riding vehicle in interlock with operation of the operation element. The link mechanism includes a first link connected to the operation element, and a second link for connecting the first link and the hook member. The hook member includes a hook portion disposed on a distal end portion of the hook member and engaged with the vehicle body, and a link mechanism connecting portion disposed on a base end portion of the hook member and connected to a first connecting shaft on one end portion of the second link. The hook member is pivotably supported by a turning shaft disposed between the hook portion and the link mechanism connecting portion. A second connecting shaft connected to the first link is disposed on the other end portion of the second link. When the hook portion is engaged with the vehicle body, a straight line connecting the turning shaft and the first connecting shaft is substantially orthogonal to a straight line connecting the first connecting shaft and the second connecting shaft.

In this configuration, since the straight line connecting the turning shaft of the hook member and the first connecting shaft is substantially orthogonal to the straight line connecting the first connecting shaft and the second connecting shaft of the second link, a force of the hook member to turn around the turning shaft acts on the second link at a substantially right angle from the hook member, and the force is hardly transmitted from the second link to the first link. As a result, even if an external force acts on the hook portion engaged with the vehicle body, the hook member hardly moves, and therefore, oscillation of the hook member and the link mechanism can be reduced. Consequently, the storage case can be firmly attached to the vehicle body.

Also, in the above configuration, one end portion of the first link is pivotably supported by a link turning shaft, and the other end portion of the first link is connected to the second connecting shaft of the second link. The first link is connected to the operation element via an operation element-side link disposed between the first link and the operation element. One end portion of the operation element-side link is connected to the operation element, and the other end of the operation element-side link may be connected to the first link via a link connecting shaft disposed between the link turning shaft and the second connecting shaft.

In this configuration, when a force acts on the first link through the second link from the hook member side, turning of the first link around the link turning shaft is suppressed by the operation element-side link. Consequently, oscillation of the hook member and the link mechanism can be reduced.

Additionally, in the above configuration, the turning shaft and the link turning shaft may be fixed to the storage case so as not to move relative to each other.

Since this configuration prevents the turning shaft and the link turning shaft from moving relative to each other, oscillation of the hook member and the link mechanism can be reduced.

Furthermore, in the above configuration, the first link is connected to the operation element via the operation element-side link disposed between the first link and the operation element. The operation element-side link includes a first stopper portion that comes into contact with the operation element in association with turning of the operation element-side link. When the hook portion is not engaged with the vehicle body, the first stopper portion may be separated from the operation element, and when the hook portion is engaged with the vehicle body, the first stopper portion may come into contact with the operation element.

In this configuration, when the hook portion is engaged with the vehicle body, the first stopper portion of the operation element-side link comes into contact with the operation element, so that oscillation of the operation element-side link is reduced, and also oscillation of the hook member connected to the operation element-side link via the link mechanism can be reduced.

In addition, the above configuration includes a storage case body for storing articles, and a cover member attached to the storage case body and covering the link mechanism. The operation element includes a second stopper portion that comes into contact with the cover member in association with turning of the operation element. When the hook portion is not engaged with the vehicle body, the second stopper portion may be separated from the cover member, and when the hook portion is engaged with the vehicle body, the second stopper portion may come into contact with the cover member.

In this configuration, when the hook portion is engaged with the vehicle body, the second stopper portion of the operation element comes into contact with the cover member, so that oscillation of the operation element is reduced, and also oscillation of the hook member and the link mechanism in interlock with the operation element can be reduced.

Also, in the above configuration, the operation element is pivotably supported by an operation element turning shaft. The other end portion of the operation element-side link is connected to the first link via the link connecting shaft. The one end portion of the operation element-side link is connected to the operation element via an operation element connecting shaft. When the hook portion is engaged with the vehicle body, of angles which are formed by a straight line connecting the link connecting shaft and the operation element connecting shaft and a straight line connecting the operation element connecting shaft and the operation element turning shaft, an angle which is on a side that the angle increases in a case of releasing the engagement of the hook portion with the vehicle body is smaller than 180°.

In this configuration, when the first link turns around the link turning shaft by a force from the hook member side, of the angles which are formed by the straight line connecting the link connecting shaft and the operation element connecting shaft and the straight line connecting the operation element connecting shaft and the operation element turning shaft, the angle on the side that the angle increases on releasing the engagement of the hook portion with the vehicle body tends to decrease to an angle smaller than 180°. Accordingly, turning of the first link can be restricted by the operation element-side link, and oscillation of the hook member and the link mechanism can be reduced.

MODE FOR CARRYING OUT THE INVENTION

Hereinafter, an embodiment of the present invention will be described with reference to the figures. Note that, in the explanation, descriptions of directions such as front and rear, right and left, and up and down are regarded as the same as directions with respect to the vehicle body unless otherwise specified. In addition, a symbol "FR" in each figure indicates the front side of the vehicle body, a symbol "UP" indicates the upper side of the vehicle body, and a symbol "LH" indicates the left side of the vehicle body.

Figure 1:
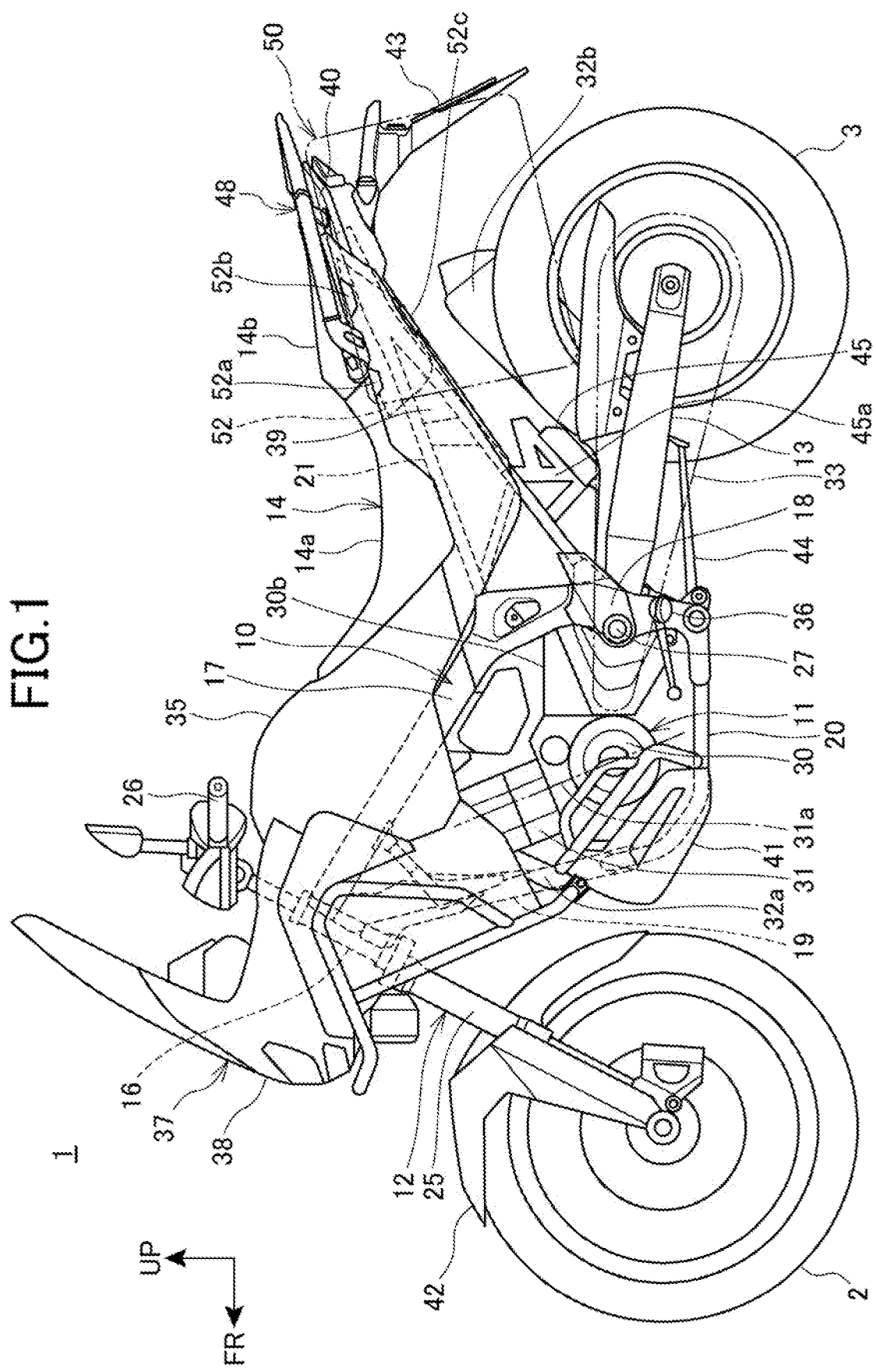
FIG. 1 is a left-side view of a motorcycle according to an embodiment of the present invention.

FIG. 1 is a left-side view of a motorcycle according to an embodiment of the present invention.

A motorcycle 1 is a vehicle in which an engine 11 as a power unit is supported by a vehicle body frame 10, a steering system 12 that steerably supports a front wheel 2 is steerably supported by a front end of the vehicle body frame 10, and swing arms 13 that support a rear wheel 3 are disposed on a rear side of the vehicle body frame 10.

The motorcycle 1 is a saddle riding vehicle on which an occupant sits so as to straddle a seat 14, and the seat 14 is disposed on a rear upper side of the vehicle body frame 10.

The vehicle body frame 10 includes a head pipe 16, a pair of right and left main frames 17, a pair of right and left pivot frames 18, a down frame 19, a pair of right and left lower frames 20, and a pair of right and left seat frames 21.

Specifically, the head pipe 16 is disposed on the front end of the vehicle body frame 10 and positioned in the middle of a vehicle width.

The right and left main frames 17 downwardly extend rearward from the head pipe 16.

The right and left pivot frames 18 extend downward from a rear end of the main frame 17.

The single down frame 19 is attached to the head pipe 16, extends downward from a lower position of the main frames 17, and is positioned in the middle of the vehicle width.

The right and left lower frames 20 branch to right and left sides from a lower end portion of the down frame 19, individually extend rearward, and are joined to the lower end portions of the pivot frames 18.

The right and left seat frames 21 upwardly extend rearward from upper portions of the pivot frames 18.

The steering system 12 includes a pair of right and left front forks 25 steerably disposed via a steering shaft (not illustrated in the figure) axially supported by the head pipe 16, and a handle 26 disposed on upper end portions of the front forks 25. The front wheel 2 is axially supported on lower end portions of the front forks 25.

Front end portions of the swing arms 13 are axially supported by a pivot shaft 27 for connecting the right and left pivot frames 18 in the vehicle width direction. The swing arms 13 swing up and down around the pivot shaft 27. The rear wheel 3 is axially supported by rear end portions of the swing arms 13.

In a side view of the vehicle, an engine 11 is disposed between the main frame 17 and the lower frames 20 and between the down frame 19 and the pivot frames 18, and supported by the vehicle body frame 10.

The engine 11 includes a crank case 30 that supports a crank shaft (not illustrated in the figure) horizontally extending in the vehicle width direction (horizontal direction), and a cylinder portion 31 extending upward from a front portion of the crank case 30. A cylinder axis line 31a of the cylinder portion 31 leans forward with respect to the vertical direction.

An air intake apparatus (not illustrated in the figure) of the engine 11 is joined to an air intake port on a rear face of the cylinder portion 31.

An air exhaust apparatus of the engine 11 includes an air exhaust pipe 32a joined to an air exhaust port on a front face of the cylinder portion 31, and a muffler 32b joined to a downstream end of the air exhaust pipe 32a.

A rear portion of the crank case 30 is a transmission case portion 30b for accommodating a transmission. An output power of the engine 11 is transmitted to the rear wheel 3 via a drive chain 33 for joining an output shaft of the transmission and the rear wheel 3.

The seat 14 is supported by the seat frames 21 from below. The seat 14 includes a front seat 14a on which the driver sits and a rear seat 14b on which a passenger sits integrally.

A fuel tank 35 is disposed between the head pipe 16 and the seat 14, and supported by the main frame 17 above the engine 11.

A pair of right and left steps 36 on which the driver's feet are rested are disposed on the lower end portions of the pivot frames 18.

The motorcycle 1 includes a vehicle body cover 37 for covering the vehicle body including the vehicle body frame 10 and the engine 11. The vehicle body cover 37 includes a front cover 38 for covering the head pipe 16 and an upper portion of the steering system 12 from a front side and lateral sides, a pair of right and left rear side covers 39 for covering the seat frames 21 under the seat 14, a tail cover 40 for covering a rear portion of the seat 14 from above, and an under cover 41 for covering a lower portion of the engine 11 from front.

Also, the motorcycle 1 includes a front fender 42 for covering the front wheel 2 from above, a rear fender 43 for covering the rear wheel 3 from above, and a stand 44.

Tandem steps 45 on which feet of the passenger on the rear seat 14b are rested are supported by tandem step stays 45a attached to the seat frames 21.

The grab rails 48 gripped by the passenger on the rear seat 14b are disposed on the lateral sides of the rear seat 14b behind the front seat 14a.

Pannier cases 50 (storage cases) capable of storing articles can be attached to the motorcycle 1. The pair of right and left pannier cases 50 are disposed on right and left lateral sides at the rear portion of the vehicle body of the motorcycle 1, and fixed to the vehicle body.

The motorcycle 1 includes a pair of right and left holding members 52 for holding the respective pannier cases 50.

The holding members 52 are fixed to outside faces of the seat frames 21. The holding members 52 are hidden by being covered by the rear side covers 39 from an outside.

Figure 2:
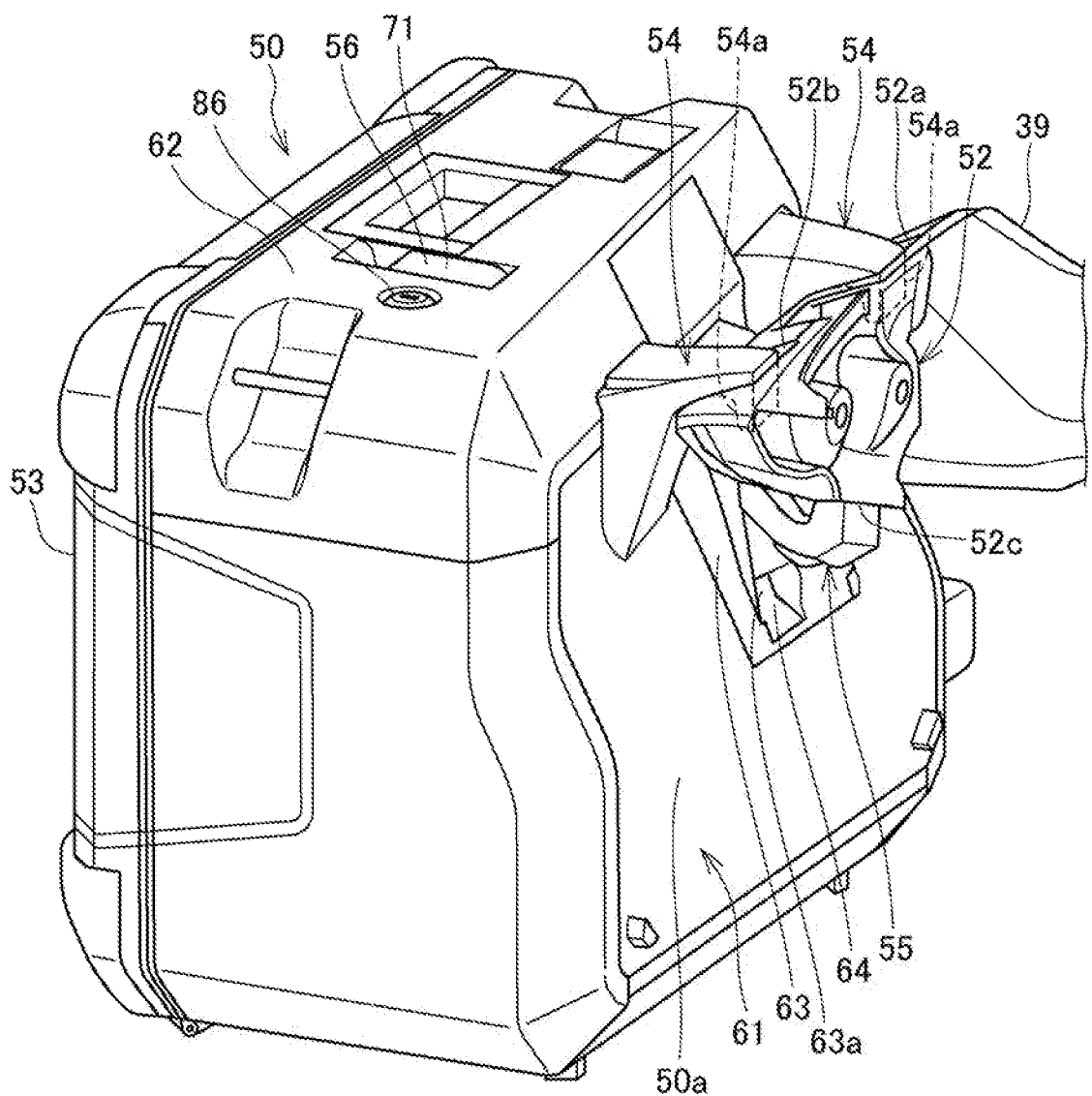
FIG. 2 is a perspective view illustrating a state of a pannier case attached to a left side, viewed from a vehicle rear side.

FIG. 2 is a perspective view illustrating a state of the pannier case attached to the left side, viewed from a vehicle rear side. Since the right and left pannier cases 50 and a mounting structure of the pannier case 50—are substantially symmetrical, the mounting structure on the left side will be explained in detail in this embodiment.

Referring to FIG. 1 and FIG. 2, an upper face of the holding member 52 has a pair of engagement hole portions 52a and 52b opening upward. A lower face of the holding member 52 has a lower engagement hole portion 52c opening downward.

The pair of engagement hole portions 52a and 52b are arranged in the front-back direction. The lower engagement hole portion 52c is positioned below the engagement hole portions 52a and 52b, and, in the front-back direction, positioned between the front engagement hole portion 52a and the rear engagement hole portion 52b.

Although the holding member 52 is disposed inside the rear side cover 39, the engagement hole portions 52a and 52b and the lower engagement hole portion 52c are exposed outside from opening portions provided on the rear side cover 39.

Referring to FIG. 2, the pannier case 50 is a hollow box member. An outside face of the pannier case 50 is an openable and closable lid 53. Once the lid 53 is opened, an article storage space in the pannier case 50 can be accessed.

On an upper portion of an inside face 50a of the pannier case 50, a pair of engagement portions 54 extending inward in the vehicle width direction are arranged in the front-back direction. On end portions of the engagement portions 54, claw portions 54a extending downward are disposed.

On the inside face 50a of the pannier case 50, a hook member 55 extending inward in the vehicle width direction is disposed below the engagement portions 54. In the front-back direction of the vehicle, the hook member 55 is disposed between the front engagement portion 54 and the rear engagement portion 54. The hook member 55 can be turned in the vertical direction.

On an upper face of the pannier case 50, an operation element 56 (operation element) is disposed for an occupant or the like to operate turning of the hook member 55.

The pannier case 50 is attached to the vehicle body such that the claw portions 54a of the engagement portions 54 are engaged with the engagement hole portions 52a and 52b of the holding member 52 from above, and the hook member 55 is engaged with the lower engagement hole portion 52c of the holding member 52 from below.

Figure 3:
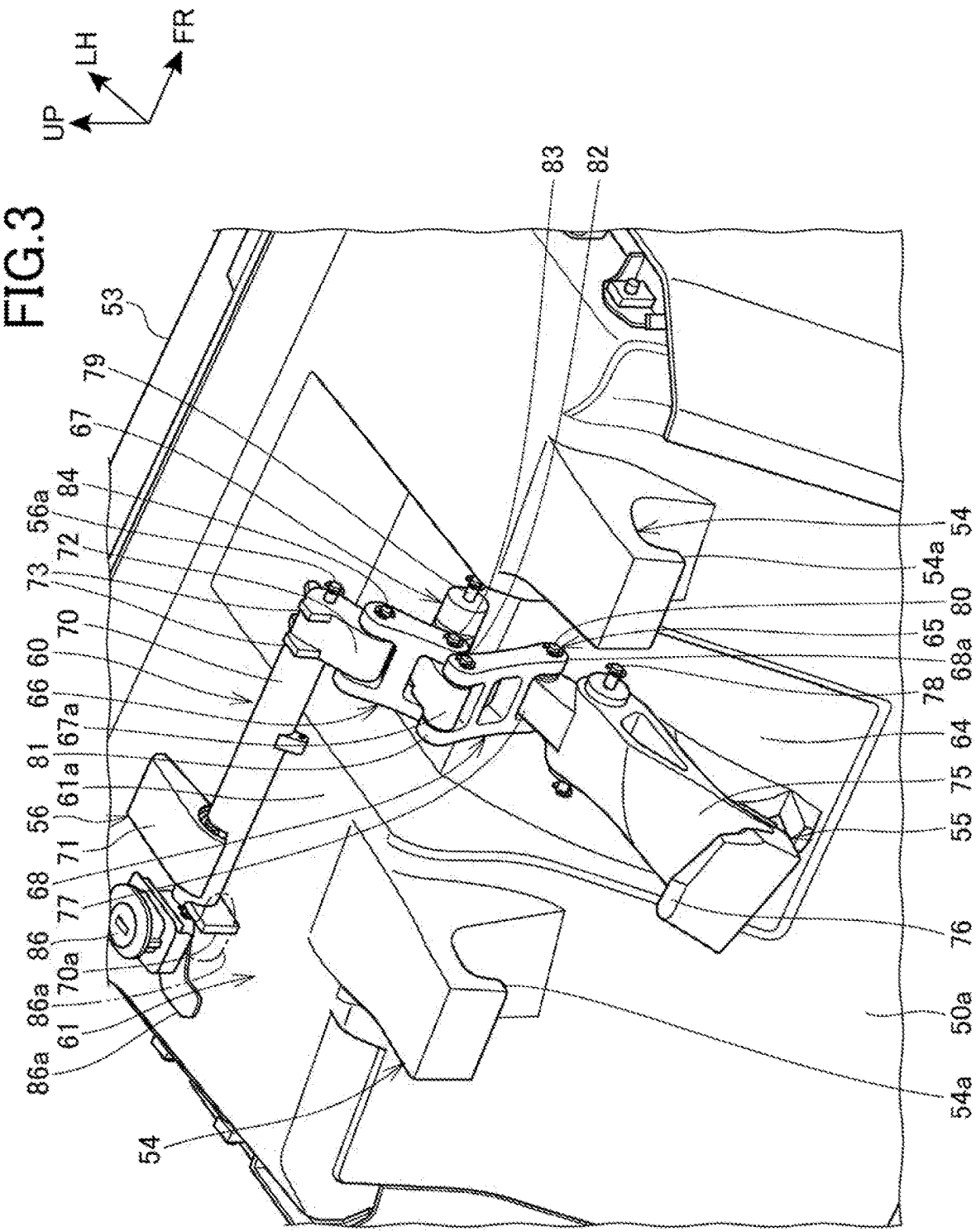
FIG. 3 is a perspective view illustrating an operation mechanism of a hook member disposed on the pannier case.

FIG. 3 is a perspective view illustrating an operation mechanism 60 of the hook member 55 disposed on the pannier case 50.

Referring to FIG. 2 and FIG. 3, the pannier case 50 includes a box-shaped storage case body 61 that defines the article storage space, an upper face cover 62 (cover member) for covering an upper face 61a of the storage case body 61 from above, and an inside face cover 63 for covering a part of the inside face 50a of the pannier case 50 from an inside in the vehicle width direction. In FIG. 3, the upper face cover 62 and the inside face cover 63 are removed.

A recessed portion 64 that is recessed outward in the vehicle width direction is disposed on the upper portion of the inside face 50a of the pannier case 50. The recessed portion 64 is disposed between the front engagement portion 54 and the rear engagement portion 54.

The inside face cover 63 covers the recessed portion 64.

The operation mechanism 60 is disposed between the upper face 61a of the storage case body 61 and the upper face cover 62 and on the recessed portion 64.

The hook member 55 is accommodated between the recessed portion 64 and the inside face cover 63. The inside face cover 63 includes an opening portion 63a which the turning hook member 55 enters.

Figure 4:
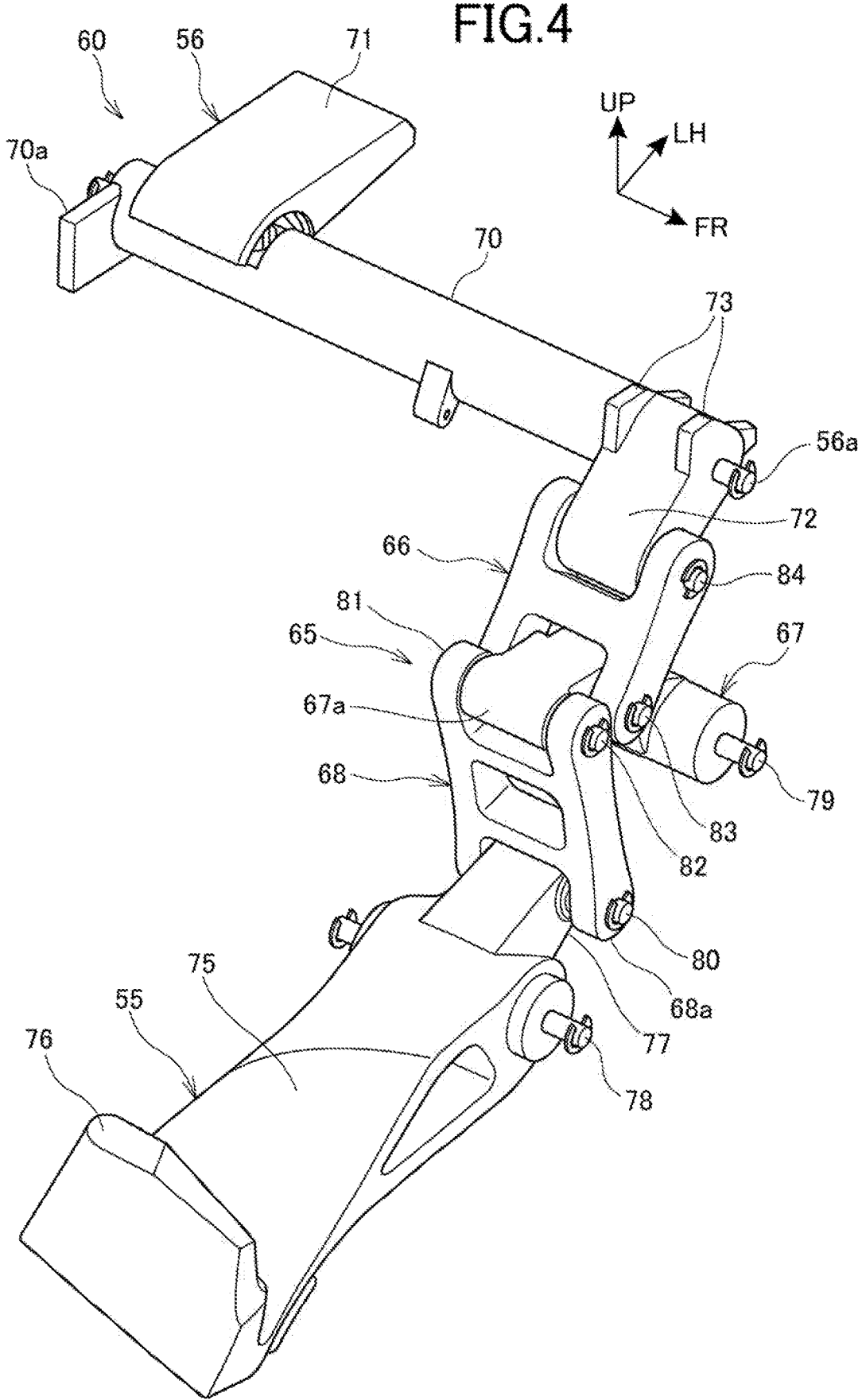
FIG. 4 is a perspective view illustrating the operation mechanism of the hook member.

FIG. 4 is a perspective view illustrating the operation mechanism 60 of the hook member 55.

Referring to FIG. 3 and FIG. 4, the operation mechanism 60 includes the operation element 56, the hook member 55, and a link mechanism 65 for joining the operation element 56 and the hook member 55.

The link mechanism 65 includes an operation element-side link 66 connected to the operation element 56, a first link 67 connected to the operation element 56 via the operation element-side link 66, and a second link 68 for connecting the first link 67 and the hook member 55.

Figure 5:
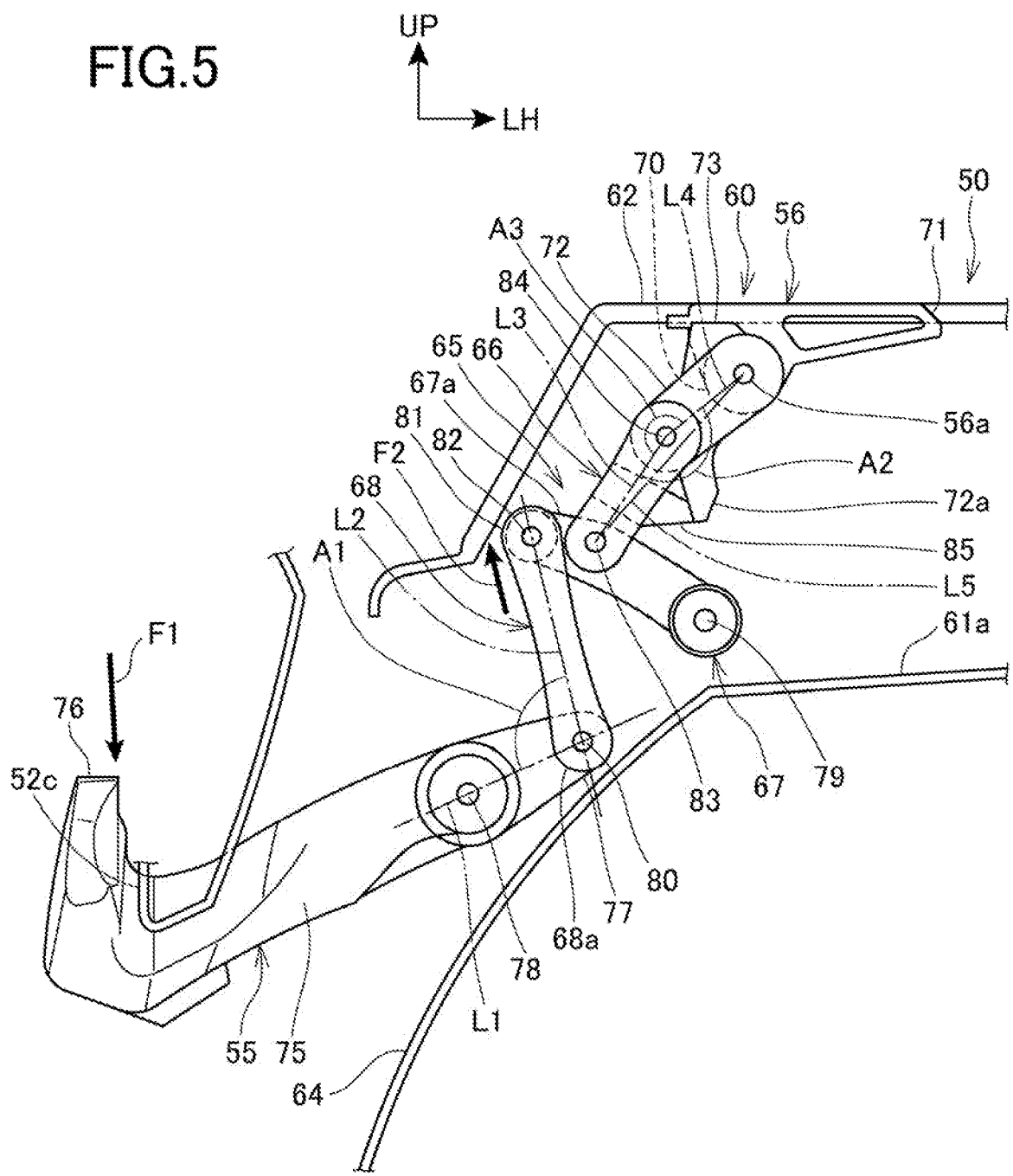
FIG. 5 is a front view of the operation mechanism.

FIG. 5 is a front view of the operation mechanism 60. FIG. 3 to FIG. 5 illustrate a state of the operation mechanism 60 in a case that the hook member 55 is engaged with the lower engagement hole portion 52c of the vehicle body.

Referring to FIG. 3 to FIG. 5, the operation element 56 includes a shaft portion 70 extending in the front-back direction of the vehicle, an operation lever portion 71 extending outward in the vehicle width direction from a rear end portion (one end portion) of the shaft portion 70, a joining portion 72 extending inward in the vehicle width direction from a front end portion (the other end portion) of the shaft portion 70, and a second stopper portion 73.

The operation element 56 is pivotably supported by the pannier case 50 via an operation element turning shaft 56a disposed on a shaft end of the shaft portion 70.

A stopper receiving portion 72a protruding downward is disposed on a lower face of the joining portion 72. The second stopper portion 73 is a protrusion extending upward from an upper face of the joining portion 72.

An operation restricting piece 70a extending inward in the vehicle width direction is disposed on the one end portion of the shaft portion 70.

The shaft portion 70 and the joining portion 72 are hidden by being disposed inside the upper face cover 62. The operation lever portion 71 is exposed upward from an opening of the upper face cover 62. The operation lever portion 71 is disposed behind the pair of engagement portions 54.

When the operation lever portion 71 is turned, the shaft portion 70 turns around the operation element turning shaft 56a extending in the vehicle front-back direction, and the joining portion 72 also turns integrally with the shaft portion 70.

The hook member 55 includes an arm portion 75 extending long in the vehicle width direction, a hook portion 76 disposed on the distal end portion of the arm portion 75 and engaged with the lower engagement hole portion 52c of the vehicle body from below, and a link mechanism connecting portion 77 disposed on a base end portion of the arm portion 75 and connected to the link mechanism 65.

The hook member 55 is pivotably supported by the pannier case 50 via a turning shaft 78 disposed between the hook portion 76 and the link mechanism connecting portion 77 on the arm portion 75. The hook member 55 can turn around the turning shaft 78 extending in the vehicle front-back direction.

The hook member 55 is disposed on the inside and a lower side in the vehicle width direction with respect to the operation element 56.

The link mechanism 65 is disposed between the operation element 56 and the hook member 55.

The first link 67 of the link mechanism 65 is pivotably supported by the pannier case 50 via a link turning shaft 79 disposed on one end portion of the first link 67. The link turning shaft 79 is positioned on the inside and the lower side in the vehicle width direction with respect to the operation element turning shaft 56a, and on an outside and an upper side in the vehicle width direction with respect to the turning shaft 78 of the hook member 55.

The first link 67 extends inward in the vehicle width direction from the link turning shaft 79, and the other end portion 67a of the first link 67 is positioned above the link mechanism connecting portion 77 of the hook member 55.

One end portion 68a of the second link 68 is connected to the hook member 55 via a first connecting shaft 80 disposed on the link mechanism connecting portion 77 of the hook member 55.

The second link 68 extends upward from the first connecting shaft 80. A first link connecting portion 81 connected to the other end portion 67a of the first link 67 is disposed on the other end portion of the second link 68.

The second link 68 is connected to the other end portion 67a of the first link 67 via a second connecting shaft 82 disposed on the first link connecting portion 81.

One end portion of the operation element-side link 66 is connected to the first link 67 via a link connecting shaft 83 disposed between the link turning shaft 79 and the first link connecting portion 81 on the first link 67.

The other end portion of the operation element-side link 66 is connected to the joining portion 72 of the operation element 56 by an operation element connecting shaft 84.

A first stopper portion 85 protruding downward is disposed on a lower face of the other end portion of the operation element-side link 66.

The operation element turning shaft 56a, the operation element connecting shaft 84, the link connecting shaft 83, the link turning shaft 79, the second connecting shaft 82, the first connecting shaft 80, and the turning shaft 78 extend substantially parallel to each other in the vehicle front-back direction.

In addition, the operation element turning shaft 56a, the link turning shaft 79, and the turning shaft 78 are supported by the pannier case 50, and do not move relative to each other. Herein, the operation element turning shaft 56a, the link turning shaft 79, and the turning shaft 78 are fixed to, for example, the storage case body 61, and may be fixed to a cover such as the upper face cover 62.

As illustrated in FIG. 2 and FIG. 3, a key cylinder 86 that is pivotably operated by a key (not illustrated in the figure) possessed by an occupant or the like is disposed on the upper face of the pannier case 50. A lock member 86a that turns integrally with the key cylinder 86 is disposed below the key cylinder 86. A turning axis line of the key cylinder 86 is vertically oriented.

As illustrated in FIG. 5, in the "fixed case state" in which the hook member 55 is engaged with the lower engagement hole portion 52c of the holding member 52 from below, the pannier case 50 is fixed to the vehicle body by the pair of engagement portions 54 and the hook member 55.

In the "fixed case state," the operation lever portion 71 is accommodated in the opening of the upper face cover 62, in a substantially horizontal position.

In the "fixed case state," the hook member 55 downwardly slopes inward in the vehicle width direction toward the lower engagement hole portion 52c.

In the "fixed case state," the second link 68 upwardly extends inward in the vehicle width direction from the first connecting shaft 80, and is connected to the first link 67.

In the "fixed case state," the first link 67 downwardly extends outward in the vehicle width direction from the second connecting shaft 82, and is connected to the link turning shaft 79.

In the "fixed case state," the operation element-side link 66 upwardly extends outward in the vehicle width direction from the link connecting shaft 83, and is connected to the operation element 56 via the operation element connecting shaft 84.

In a state that the lock member 86a of the key cylinder 86 overlaps the operation restricting piece 70a of the operation element 56 from below as indicated by a virtual line in FIG. 3, the lock member 86a comes into contact with the operation restricting piece 70a, so that the turning operation of the operation element 56 is restricted. Accordingly, theft of the pannier case 50 can be prevented.

Once the lock member 86a is separated from the operation restricting piece 70a by operation of the key cylinder 86 as indicated by a solid line in FIG. 3, the operation element 56 can perform the turning operation.

Figure 6:
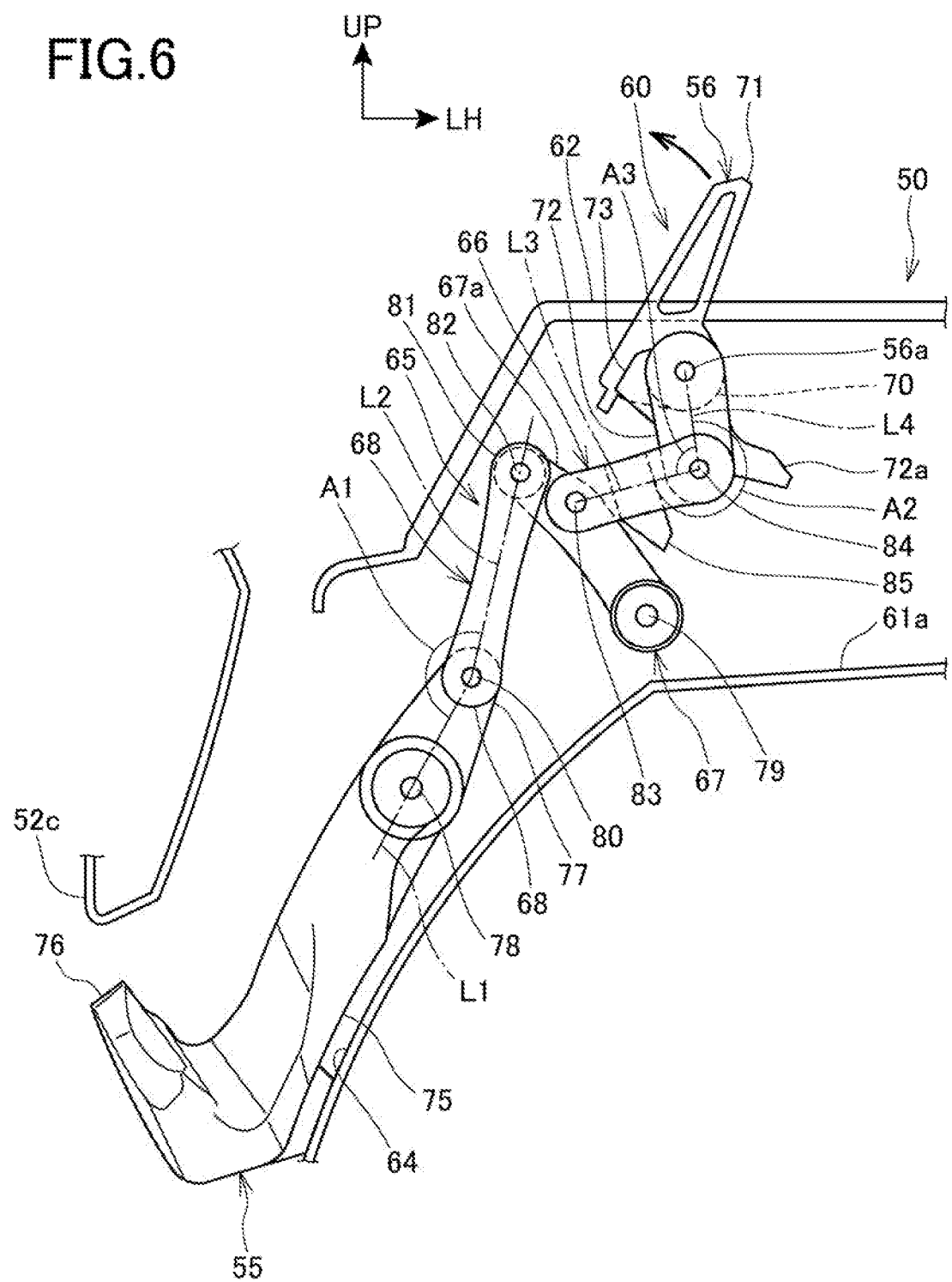
FIG. 6 is a diagram illustrating a state that a "fixed case state" is released.

FIG. 6 is a diagram illustrating a state that a "fixed case state" is released.

As illustrated in FIG. 6, once the operation lever portion 71 is turned around the operation element turning shaft 56a so as to open upward, the hook member 55 moves downward in interlock with operation of the operation lever portion 71, and the "fixed case state" is released, so that the pannier case 50 can be removed from the vehicle body.

Specifically, in association with operation of the operation lever portion 71, the operation element connecting shaft 84 downwardly moves outward in the vehicle width direction, and the first link 67 upwardly turns around the link turning shaft 79 and outward in the vehicle width direction, so as to be pulled by the operation element-side link 66. Furthermore, when the second link 68 is pulled upward by the first link 67, the first connecting shaft 80 moves upward, and the hook member 55 turns around the turning shaft 78 and in a direction of the link mechanism connecting portion 77 moving upward. Accordingly, the hook portion 76 of the hook member 55 leaves downward from the lower engagement hole portion 52c.

Referring to FIG. 5, in the "fixed case state," a straight line L1 connecting the turning shaft 78 of the hook member 55 and the first connecting shaft 80 of the second link 68 is substantially orthogonal to a straight line L2 connecting the first connecting shaft 80 and the second connecting shaft 82. That means, in the "fixed case state," the hook member 55 and the second link 68 are arranged so as to be substantially orthogonal to each other in an axial direction view of the turning shaft 78.

An angle A1 formed by the straight line L1 and the straight line L2 is approximately 90°. Specifically, the angle A1 is slightly larger than 90° in this embodiment, and the angle A1 may be just 90° or slightly smaller than 90°.

In addition, in the "fixed case state," each of the angle A2 and the angle A3 is an angle formed by a straight line L3 connecting the link connecting shaft 83 and the operation element connecting shaft 84 and a straight line L4 connecting the operation element connecting shaft 84 and the operation element turning shaft 56a.

As illustrated in FIG. 5 and FIG. 6, the angle A2 is an angle on a side that the angle gradually increases on releasing the engagement of the hook member 55 with the vehicle body from the "fixed case state." The angle A2 is formed below the operation element connecting shaft 84.

As illustrated in FIG. 5 and FIG. 6, the angle A3 is an angle on a side that the angle gradually decreases on releasing the engagement of the hook member 55 with the vehicle body from the "fixed case state." The angle A3 is formed above the operation element connecting shaft 84.

In the "fixed case state," the angle A2 is smaller than 180°, and the operation element connecting shaft 84 is positioned above a straight line L5 connecting the link connecting shaft 83 and the operation element turning shaft 56a.

An external force F1 may be input from the vehicle body side to the hook member 55 due to vibration of the motorcycle 1 or the like in some cases.

The external force F1 input from the vehicle body side to the hook member 55 is output upward as a force F2 through the second link 68 in the direction of the straight line L2 substantially orthogonal to the straight line L1. The direction of the force F2 is significantly different from the turning direction of the first link 67 in association with release of the "fixed case state." Accordingly, movement of the link mechanism 65 due to the external force F1 can be suppressed, and therefore, oscillation of the hook member 55 can be reduced. Accordingly, oscillation of the link mechanism 65 can also be reduced.

Additionally, in the "fixed case state," the first link 67 is pressed by the operation element-side link 66 substantially orthogonal to the first link 67. Accordingly, movement of the link mechanism 65 due to the external force F1 can be suppressed, and therefore, oscillation of the hook member 55 can be reduced.

Furthermore, when the first link 67 turns due to the external force F1, the first link 67 and the operation element-side link 66 move in a direction for further reducing the angle A2, because the angle A2 is smaller than 180°. For releasing the "fixed case state," the operation element-side link 66 should be turned such that the angle A2 is larger than 180° as illustrated in FIG. 6. Accordingly, movement of the link mechanism 65 due to the external force F1 can be suppressed, and therefore, oscillation of the hook member 55 can be reduced.

As illustrated in FIG. 5, in the "fixed case state," the first stopper portion 85 of the operation element-side link 66 comes into contact with the stopper receiving portion 72a of the operation element 56, and movement of the operation element-side link 66 is restricted. Accordingly, movement of the link mechanism 65 due to the external force F1 can be suppressed, and therefore, oscillation of the hook member 55 can be reduced.

As illustrated in FIG. 6, the first stopper portion 85 is separated from the stopper receiving portion 72a when the hook member 55 is not engaged with the lower engagement hole portion 52c.

Furthermore, in the "fixed case state," the second stopper portion 73 of the operation element 56 comes into contact with the inside face of the upper face cover 62 from below, so that turning of the operation element 56 is restricted. Accordingly, the external force acting on the hook member 55, and movement of the operation element 56 due to vibration of the pannier case 50 can be suppressed, and oscillation of the hook member 55 can be reduced.

As illustrated in FIG. 6, the second stopper portion 73 is separated from the inside face of the upper face cover 62 when the hook member 55 is not engaged with the lower engagement hole portion 52c.

Figure 7:
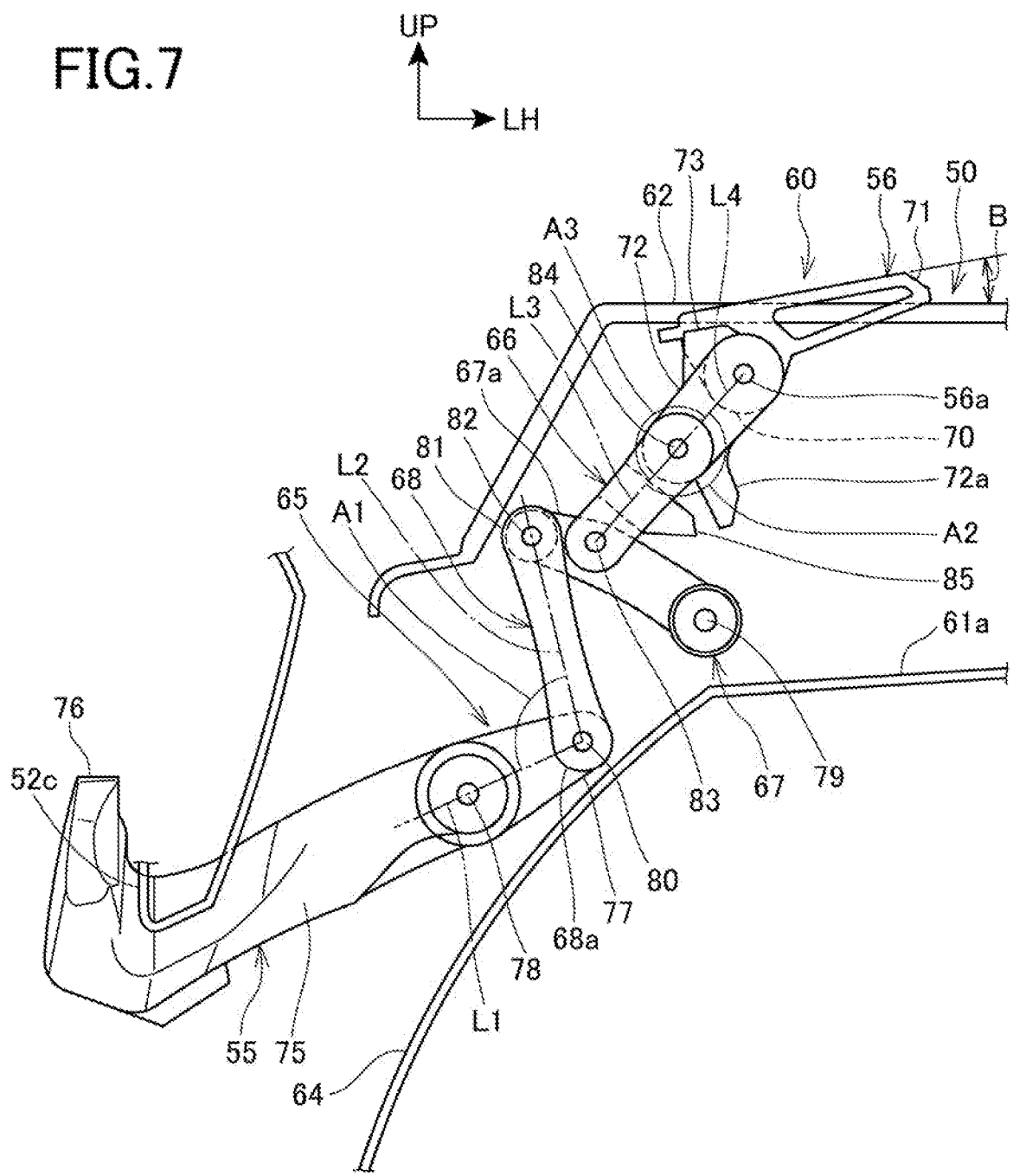
FIG. 7 is a diagram illustrating a state that an operation element is turned by only a predetermined angle in a direction for releasing the "fixed case state."

FIG. 7 is a diagram illustrating a state that the operation element 56 is turned by only a predetermined angle B in a direction for releasing the "fixed case state."

As illustrated in FIG. 7, when operating the operation lever portion 71, unlike the case that the external force F1 acts from the side of the hook member 55 as described above, the operation element-side link 66 can be turned such that the angle A2 is larger than 180°. Accordingly, the "fixed case state" can be released by operation of the operation element 56.

In addition, FIG. 6 illustrates a state that the operation lever portion 71 is operated to the maximum operable angle in a direction for releasing the "fixed case state." In this state, the angle A1 formed by the straight line L1 and the straight line L2 is smaller than 180°. Accordingly, the state in FIG. 6 can be restored to the "fixed case state" in FIG. 5 by operating the operation lever portion 71.

When the angle A1 is larger than 180°, the angle A1 is required to pass through 180° so as to be equal to or smaller than 180°, and it is difficult to restore the state to the "fixed case state" by operating the operation lever portion 71.

As explained above, according to the embodiment to which the present invention is applied, the pannier case 50 includes the operation element 56, the hook member 55, and the link mechanism 65 for joining the operation element 56 and the hook member 55. The hook member 55 is engaged with the vehicle body of the motorcycle 1 in interlock with operation of the operation element 56, the link mechanism 65 includes the first link 67 connected to the operation element 56, and the second link 68 for connecting the first link 67 and the hook member 55. The hook member 55 includes the hook portion 76 disposed on the distal end portion of the hook member 55 and engaged with the vehicle body, and the link mechanism connecting portion 77 disposed on the base end portion of the hook member 55 and connected to the first connecting shaft 80 on one end portion 68a of the second link 68. The hook member 55 is pivotably supported by the turning shaft 78 disposed between the hook portion 76 and the link mechanism connecting portion 77. The second connecting shaft 82 connected to the first link 67 is disposed on the other end portion of the second link 68. When the hook portion 76 is engaged with the vehicle body, the straight line L1 connecting the turning shaft 78 and the first connecting shaft 80 is substantially orthogonal to the straight line L2 connecting the first connecting shaft 80 and the second connecting shaft 82.

In this configuration, since the straight line L1 connecting the turning shaft 78 of the hook member 55 and the first connecting shaft 80 is substantially orthogonal to the straight line L2 connecting the first connecting shaft 80 and the second connecting shaft 82 of the second link 68, the force F2 of the hook member 55 to turn around the turning shaft 78 acts on the second link 68 at a substantially right angle from the hook member 55, and the force is hardly transmitted from the second link 68 to the first link 67. As a result, even if the external force F1 acts on the hook portion 76 engaged with the vehicle body, the hook member 55 hardly moves, and therefore, oscillation of the hook member 55 and the link mechanism 65 can be reduced. Consequently, the pannier case 50 can be firmly attached to the vehicle body.

In addition, one end portion of the first link 67 is pivotably supported by the link turning shaft 79, and the other end portion is connected to the second connecting shaft 82 of the second link 68. The first link 67 is connected to the operation element 56 via the operation element-side link 66 disposed between the first link 67 and the operation element 56. One end portion of the operation element-side link 66 is connected to the operation element 56, and the other end of the operation element-side link 66 is connected to the first link 67 via the link connecting shaft 83 disposed between the link turning shaft 79 and the second connecting shaft 82.

In this configuration, when the force F2 acts on the first link 67 through the second link 68 from the side of the hook member 55, turning of the first link 67 around the link turning shaft 79 is suppressed by the operation element-side link 66. Consequently, oscillation of the hook member 55 and the link mechanism 65 can be reduced.

In addition, the turning shaft 78 and the link turning shaft 79 are fixed to the pannier case 50 so as not to move relative to each other.

Since this configuration prevents the turning shaft 78 and the link turning shaft 79 from moving relative to each other, oscillation of the hook member 55 and the link mechanism 65 can be reduced.

Furthermore, the first link 67 is connected to the operation element 56 via the operation element-side link 66 disposed between the first link 67 and the operation element 56. The operation element-side link 66 includes the second stopper portion 73 that comes into contact with the operation element 56 in association with turning of the operation element-side link 66. When the hook portion 76 is not engaged with the vehicle body, the second stopper portion 73 is separated from the operation element 56, and when the hook portion 76 is engaged with the vehicle body, the second stopper portion 73 comes into contact with the operation element 56.

In this configuration, when the hook portion 76 is engaged with the vehicle body, the second stopper portion 73 of the operation element-side link 66 comes into contact with the operation element 56, so that oscillation of the operation element-side link 66 is reduced, and also oscillation of the hook member 55 connected to the operation element-side link 66 via the link mechanism 65 can be reduced.

In addition, the pannier case 50 includes the storage case body 61 for storing articles, and the upper face cover 62 attached to the storage case body 61 and covering the link mechanism 65. The operation element 56 includes the first stopper portion 85 that comes into contact with the upper face cover 62 in association with turning of the operation element 56. When the hook portion 76 is not engaged with the vehicle body, the first stopper portion 85 is separated from the upper face cover 62, and when the hook portion 76 is engaged with the vehicle body, the first stopper portion 85 comes into contact with the upper face cover 62.

In this configuration, when the hook portion 76 is engaged with the vehicle body, the first stopper portion 85 of the operation element 56 comes into contact with the upper face cover 62, so that oscillation of the operation element 56 can be reduced, and also oscillation of the hook member 55 and the link mechanism 65 in interlock with the operation element 56 can be reduced.

In addition, the operation element 56 is pivotably supported by the operation element turning shaft 56a. The other end portion of the operation element-side link 66 is connected to the first link 67 via the link connecting shaft 83. The one end portion of the operation element-side link 66 is connected to the operation element 56 via the operation element connecting shaft 84. When the hook portion 76 is engaged with the vehicle body, of the angles which are formed by the straight line L3 connecting the link connecting shaft 83 and the operation element connecting shaft 84 and the straight line L4 connecting the operation element connecting shaft 84 and the operation element turning shaft 56a, the angle A3 on the side that the angle increases on releasing the engagement of the hook portion 76 with the vehicle body is smaller than 180°.

In this configuration, when the first link 67 turns around the link turning shaft 79 by the force F2 from the side of the hook member 55, the angle A3 tends to change in a direction for decreasing to an angle smaller than 180°. Accordingly, turning of the first link 67 can be effectively restricted by the operation element-side link 66, and oscillation of the hook member 55 and the link mechanism 65 can be reduced.

Note that the above embodiment represents one aspect to which the present invention is applied, and the present invention is not limited to the above embodiment.

In the above embodiment, although the present invention has been explained with reference to the motorcycle 1 as a saddle riding vehicle, the present invention is not limited to this, and can be applied to a three-wheel saddle riding vehicle having two front wheels or two rear wheels, and a saddle riding vehicle having four or more wheels.

DESCRIPTION OF REFERENCE SYMBOLS

1: Motorcycle (saddle riding vehicle)
50: Pannier case (storage case)
55: Hook member
56: Operation element
56a: Operation element turning shaft
61: Storage case body
62: Upper face cover (cover member)
65: Link mechanism
66: Operation element-side link
67: First link
68: Second link
73: Second stopper portion
76: Hook portion
77: Link mechanism connecting portion
78: Turning shaft
79: Link turning shaft
80: First connecting shaft
82: Second connecting shaft
83: Link connecting shaft
84: Operation element connecting shaft
85: First stopper portion
A2: Angle (on the side that increases on releasing the engagement)
L1: Straight line (connecting the turning shaft and the first connecting shaft)
L2: Straight line (connecting the first connecting shaft and the second connecting shaft)
L3: Straight line (connecting the link connecting shaft and the operation element connecting shaft)
L4: Straight line (connecting the operation element connecting shaft and the operation element turning shaft)

The invention claimed is:

1. A storage case that is adapted to be releasably engaged with a vehicle body of a saddle riding vehicle, said storage case comprising
   a hollow box member that includes an operation element, a hook member, and a link mechanism, wherein said link mechanism joins the operation element and the hook member,
   in which the hook member is engaged in use with the vehicle body of the saddle riding vehicle in interlock with operation of the operation element,
   wherein the link mechanism includes a first link connected to the operation element, and a second link for connecting the first link and the hook member,
   the hook member includes a hook portion disposed on a distal end portion of the hook member and engaged in use with the vehicle body, and a link mechanism connecting portion disposed on a base end portion of the hook member and connected to a first connecting shaft on one end portion of the second link, and the hook member is pivotably supported by a turning shaft disposed between the hook portion and the link mechanism connecting portion,
   a second connecting shaft connected to the first link is disposed on the other end portion of the second link,
   when the hook portion is engaged in use with the vehicle body, a straight line connecting the turning shaft and the first connecting shaft is orthogonal to a straight line connecting the first connecting shaft and the second connecting shaft, the first link is connected to the operation element via the operation element-side link disposed between the first link and the operation element, the operation element-side link includes a first stopper portion that comes into contact with the operation element in association with turning of the operation element-side link, and when the hook portion is not engaged in use with the vehicle body, the first stopper portion is separated from the operation element, and when the hook portion is engaged in use with the vehicle body, the first stopper portion comes into contact with the operation element.

2. The storage case according to claim 1, wherein one end portion of the first link is pivotably supported by a link turning shaft, and the other end portion of the first link is connected to the second connecting shaft of the second link, the first link is connected to the operation element via an operation element-side link disposed between the first link and the operation element, and one end portion of the operation element-side link is connected to the operation element, and the other end portion of the operation element-side link is connected to the first link via a link connecting shaft disposed between the link turning shaft and the second connecting shaft.

3. The storage case according to claim 2, wherein the turning shaft and the link turning shaft are fixed to the storage case so as not to move relative to each other.

4. The storage case according to claim 1, comprising:

a storage case body for storing articles; and a cover member attached to the storage case body and covering the link mechanism, wherein the operation element includes a second stopper portion that comes into contact with the cover member in association with turning of the operation element, and when the hook portion is not engaged in use with the vehicle body, the second stopper portion is separated from the cover member, and when the hook portion is engaged with the vehicle body, the second stopper portion comes into contact with the cover member.

5. The storage case according to claim 2, wherein the operation element is pivotably supported by an operation element turning shaft, the other end portion of the operation element-side link is connected to the first link via the link connecting shaft, the one end portion of the operation element-side link is connected to the operation element via an operation element connecting shaft, and when the hook portion is engaged in use with the vehicle body, an angle which is formed by a straight line connecting the link connecting shaft and the operation element connecting shaft and a straight line connecting the operation element connecting shaft and the operation element turning shaft and which increases when the hook portion releases the engagement with the vehicle body in use, is smaller than 180°.

6. A storage case that is adapted to be releasably engaged with a vehicle body of a saddle riding vehicle, said storage case comprising a hollow box member that includes an operation element, a hook member, and a link mechanism, wherein said link mechanism joins the operation element and the hook member, in which the hook member is engaged in use with a vehicle body of a saddle riding vehicle in interlock with operation of the operation element, wherein the link mechanism includes a first link connected to the operation element, and a second link for connecting the first link and the hook member, the hook member includes a hook portion disposed on a distal end portion of the hook member and engaged in use with the vehicle body, and a link mechanism connecting portion disposed on a base end portion of the hook member and connected to a first connecting shaft on one end portion of the second link, and the hook member is pivotably supported by a turning shaft disposed between the hook portion and the link mechanism connecting portion, a second connecting shaft connected to the first link is disposed on the other end portion of the second link, when the hook portion is engaged in use with the vehicle body, a straight line connecting the turning shaft and the first connecting shaft is-orthogonal to a straight line connecting the first connecting shaft and the second connecting shaft, one end portion of the first link is pivotably supported by a link turning shaft, and the other end portion of the first link is connected to the second connecting shaft of the second link, the first link is connected to the operation element via an operation element-side link disposed between the first link and the operation element, one end portion of the operation element-side link is connected to the operation element, and the other end portion of the operation element-side link is connected to the first link via a link connecting shaft disposed between the link turning shaft and the second connecting shaft, the operation element is pivotably supported by an operation element turning shaft, the other end portion of the operation element-side link is connected to the first link via the link connecting shaft, the one end portion of the operation element-side link is connected to the operation element via an operation element connecting shaft, and when the hook portion is engaged in use with the vehicle body, an angle which is formed by a straight line connecting the link connecting shaft and the operation element connecting shaft and a straight line connecting the operation element connecting shaft and the operation element turning shaft and which increases when the hook portion releases the engagement with the vehicle body in use, is smaller than 180°.

* * * * *